(No Model.)
J. A. BILZ.
TWO WHEELED VEHICLE.
No. 475,974.    Patented May 31, 1892.
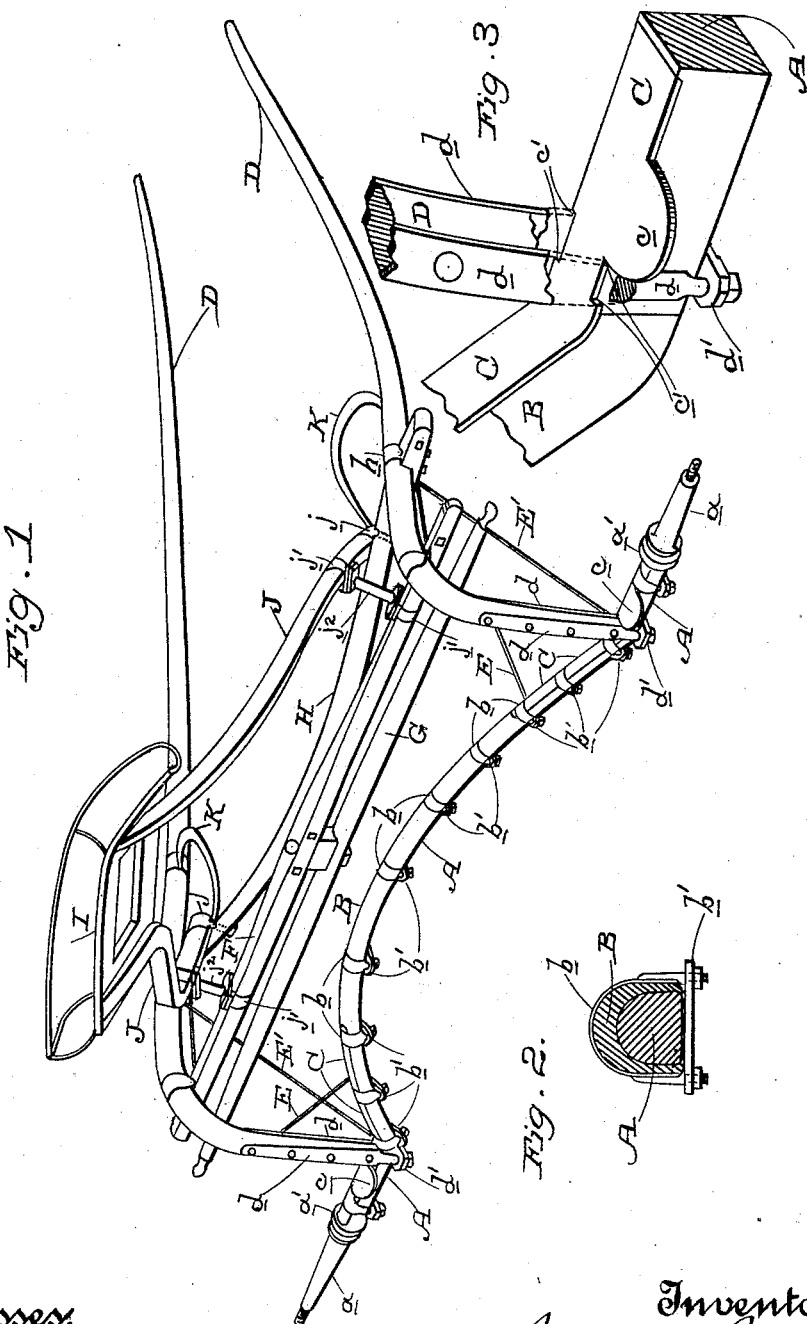
Witnesses:
Inventor,
John A. Bilz
By Dewey & Co.
Attys

UNITED STATES PATENT OFFICE.

JOHN A. BILZ, OF PLEASANTON, CALIFORNIA.

TWO-WHEELED VEHICLE.

SPECIFICATION forming part of Letters Patent No. 475,974, dated May 31, 1892.

Application filed November 20, 1891. Serial No. 412,566. (No model.)

*To all whom it may concern:*

Be it known that I, JOHN A. BILZ, a citizen of the United States, residing at Pleasanton, Alameda county, State of California, have invented an Improvement in Two-Wheeled Vehicles; and I hereby declare the following to be a full, clear, and exact description of the same.

My invention relates to the class of two-wheeled vehicles.

My invention consists in the novel construction, combination, and arrangement of parts hereinafter fully described, and specifically pointed out in the claims.

The object of my invention is to provide a simple and durable vehicle which, on account of its lightness, may be properly termed a "speeding-cart," and in which, by reason of the peculiar arrangement of parts, and especially of the axle, the horse may be hitched up close and brought back as far under the driver as possible, and the driver's seat may have all the necessary spring for comfort.

Referring to the accompanying drawings for a more complete explanation of my invention, Figure 1 is a perspective view of my vehicle, the wheels being removed. Fig. 2 is a cross-section of the axle. Fig. 3 is a perspective detail showing on an enlarged scale the attachment of the shafts to the axle.

A is the axle of my vehicle, having the end spindles $a$, on which the wheels are to be journaled. This axle is formed with straight end portions joining the spindles, and thence it is bowed or arched upwardly, as shown. The axle is made of metal and is covered with a wooden sheath B, grooved out to fit over the top and sides of the axle, as shown in cross-section, said sheath being well held to the iron portion by means of a number of clips $b$ and transverse yokes $b'$. The sheath B only reaches as far on each side as the bowed or arched part of the axle.

C are brace-straps of metal, which are fitted upon top of the axle, extending a short distance along the bowed or arched portion of it on top of the wooden sheath and outwardly along the straight portions of the axle. These brace-straps are securely held at their inner portions by the outermost of the series of clips $b$, and their outer ends are held in place by abutting snugly against the inner collar or flange $a'$ of the axle-spindle. On the outer portion of these braces are formed or secured the steps $c$, by which the driver mounts to the seat.

D are the shafts. The rear ends of these are curved downwardly, so that they extend at about right angles to their main portions. The lower ends of the shafts rest upon the straight portions of the braces C, just at the bend or arch of the axle, and they are secured firmly to the axle by means of end irons $d$, secured to the ends of the shafts and extending downwardly in notches $c'$, formed in the sides of the braces C, said irons receiving the cross-yokes $d'$ on their lower ends. A brace rod or bar E extends from the axle to the shaft ends, and another brace-rod E′ extends from the axle to the shafts at a point farther forward. This construction securely unites the shafts to the axle and holds all the parts from moving.

F is a cross-bar bolted or clipped at each end to the shafts just about where they bend downwardly and very nearly in the vertical plane of the axle. To the under portion of this cross-bar is pivoted the whiffletree G. Bolted to the front center of the cross-bar is the forwardly-bent supporting-bar H, the ends of which are clipped to the shafts at $h$.

I is the seat. This is supported upon the upper ends of wooden spring-arms J, the forward ends of which are clipped at $j$ to the curved or bent supporting-bar H, and they are also clipped to the cross-bar F by means of the double clips $j'$, with intervening rods $j^2$. Thus the seat is firmly supported and has the necessary amount of spring.

K are irons forming the foot-rests for the driver. This bowed or arched axle and the arrangement of the seat-supporting parts nearly above it provide for the bringing back of the horse as far under the driver as possible.

The shafts themselves are not only securely connected to the axle, but are joined thereto at points as near to the spindles as possible.

The straps C act as braces, so that the axle will have no tendency to flatten out of its arched or bowed shape.

The whole construction is a simple, strong, and effective one, well adapted for ordinary two-wheeled vehicles, and is especially useful for speeding purposes.

Having thus described my invention, what I claim as new, and desire to secure by Letters Patent, is—

1. In a two-wheeled vehicle, the axle having the straight ends and the upwardly arched or bowed center, the wooden sheathing fitting over and clipped to the bowed center of the axle, the bent brace-straps secured on top of the axle and formed with or having steps on their outer portions, and the shafts with bent rear ends secured to the axle on top of the brace-straps, substantially as herein described.

2. In a two-wheeled vehicle, the combination of the axle having the straight ends and the upwardly arched or bowed center, the brace-straps of the axle, the shafts having the downwardly-bent rear ends secured to the inner portions of the straight ends of the axle on top of the brace-straps, the cross-bar with its whiffletree clipped to the shafts near their bent ends, the forwardly-bent supporting-bar secured to the shafts and to the cross-bar, and the spring-arms of the seat clipped to the ends of the supporting-bar and to the cross-bar, substantially as herein described.

In witness whereof I have hereunto set my hand.

JOHN A. BILZ.

Witnesses:
S. H. NOURSE,
J. A. BAYLESS.